Sept. 2, 1952 J. A. KINGSTON 2,608,951
MILKING MACHINE

Filed March 10, 1950 4 Sheets-Sheet 1

Inventor
JONAS ARTHUR
KINGSTON
By Wendroth, Lind
& Ponack
Attorneys

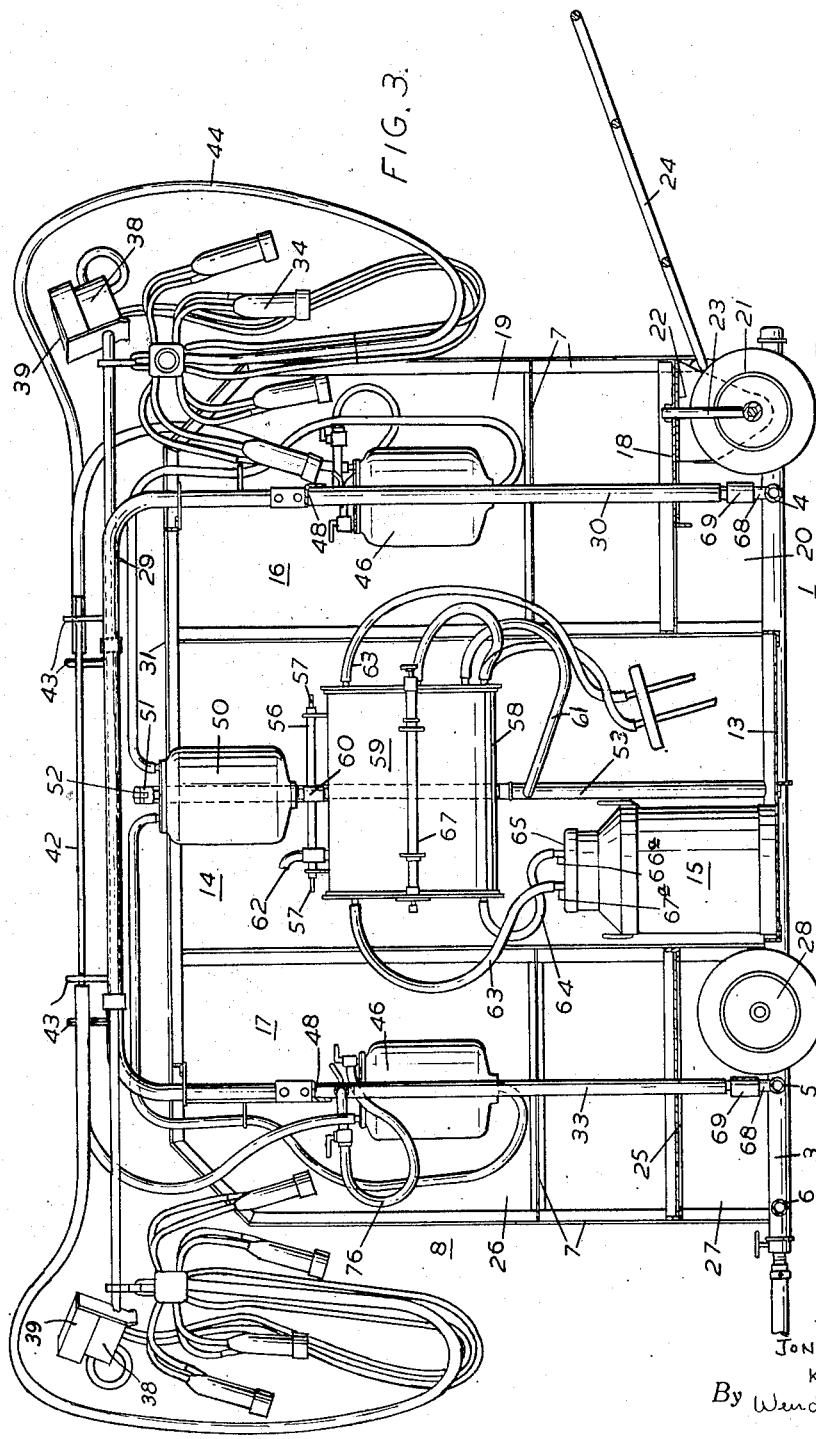

Sept. 2, 1952 J. A. KINGSTON 2,608,951
MILKING MACHINE
Filed March 10, 1950 4 Sheets-Sheet 3
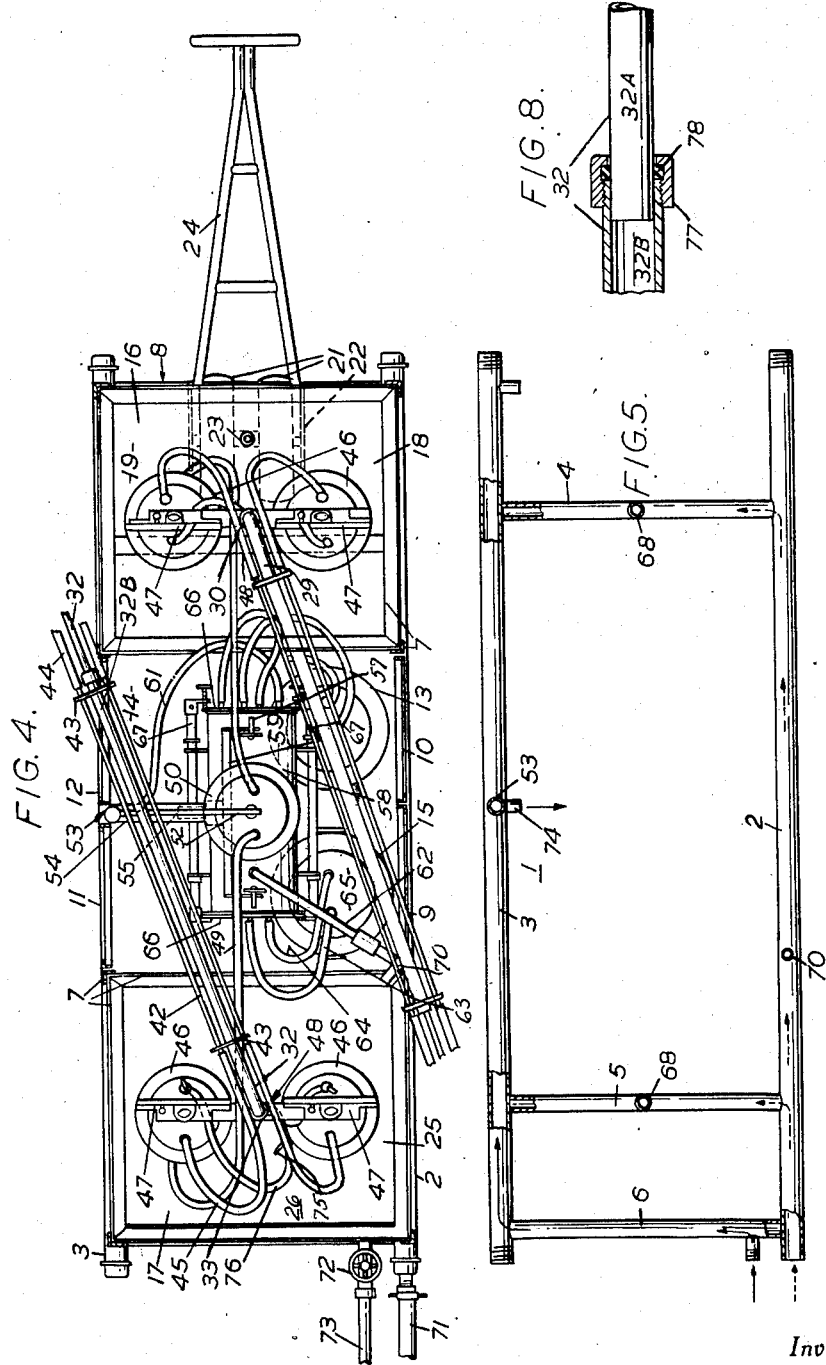
Inventor
JONAS ARTHUR
KINGSTON
By Wenderoth, Lind
& Ponack
Attorneys Sept. 2, 1952 J. A. KINGSTON 2,608,951
MILKING MACHINE
Filed March 10, 1950 4 Sheets-Sheet 4
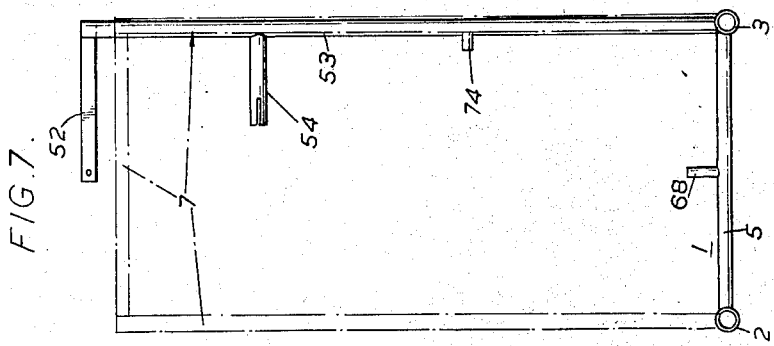
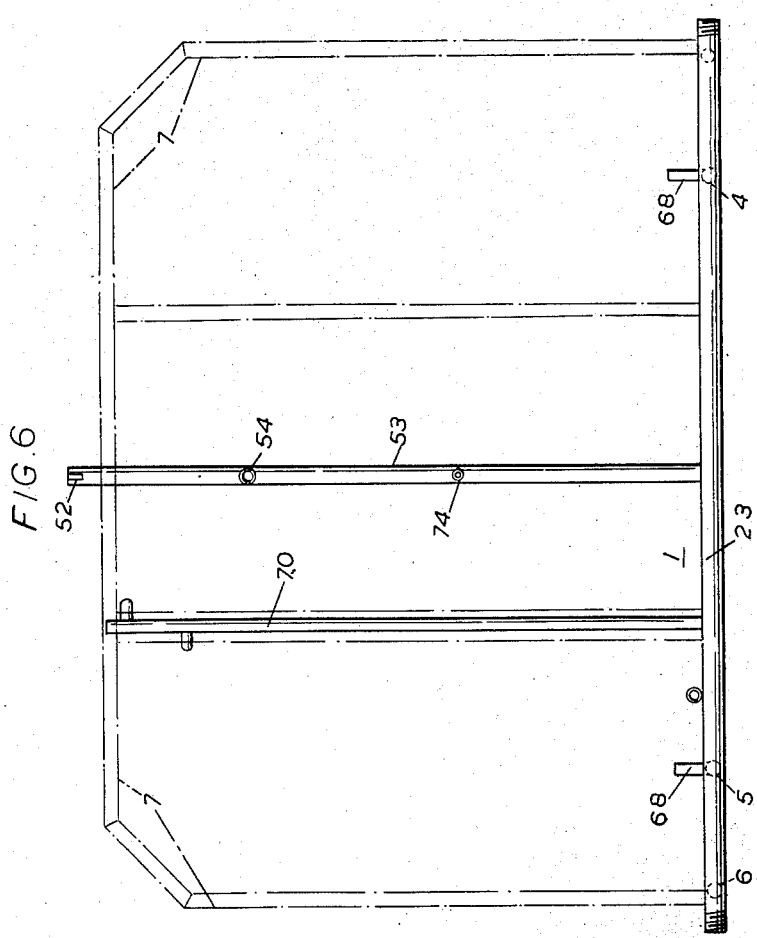
Inventor
JONAS ARTHUR KINGSTON
By Wenderoth, Lind & Ponack
Attorneys Patented Sept. 2, 1952

2,608,951

UNITED STATES PATENT OFFICE 2,608,951

MILKING MACHINE

Jonas A. Kingston, Tilehurst, near Reading, England, assignor to Gascoignes (Reading) Ltd., Reading, England, a British company Application March 10, 1950, Serial No. 148,812
In Great Britain March 15, 1949

4 Claims. (Cl. 119—14.09)

This invention relates to milking machines. In connection with comparatively small herds, for instance, about twenty in number, a portable milking machine has been employed in which a movable carriage supports the vacuum-producing means and also the main vacuum pipe in the form of a swinging arm, which latter was arranged to carry a milk pail or milk container, a teat cup cluster, a pulsator and the necessary tubes for interconnecting these components in such a manner that they could all be swung together in relation to the carriage of the machine.

The present invention is concerned with a portable milking machine of the same general arrangement as described above, except that the vacuum-producing means need not be carried by the portable machine, and has for its object the provision of such a machine constructed and furnished with equipment adapted to increase the efficiency of the milking operation as a whole.

More specifically it is an object of the present invention to provide a mobile milking machine in which the yield from each cow can be weighed automatically and the rate of milking watched as the milking operation proceeds.

Another object of the invention is to provide simplified means whereby the flow of milk into and out of the container is controlled indirectly, that is, by simply controlling the condition of vacuum in each milking assembly.

Figure 1:
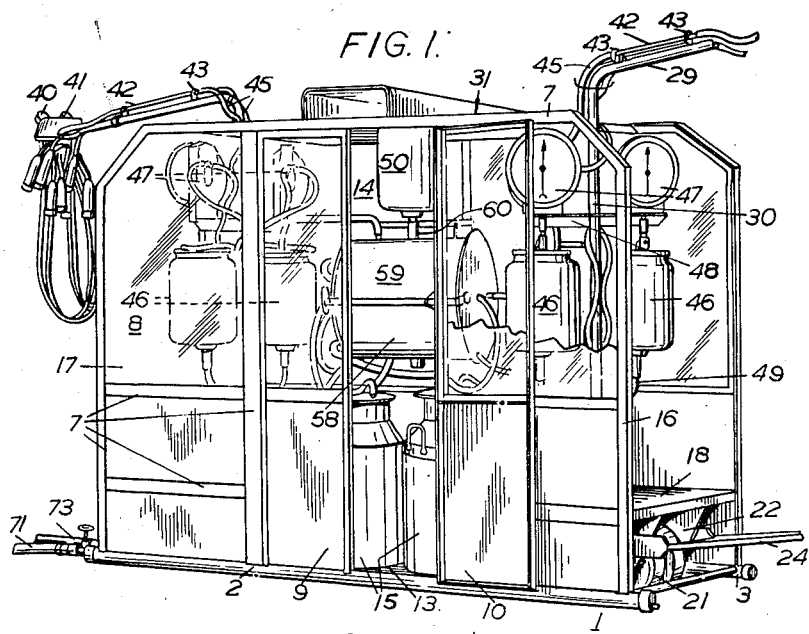
Figure 2:
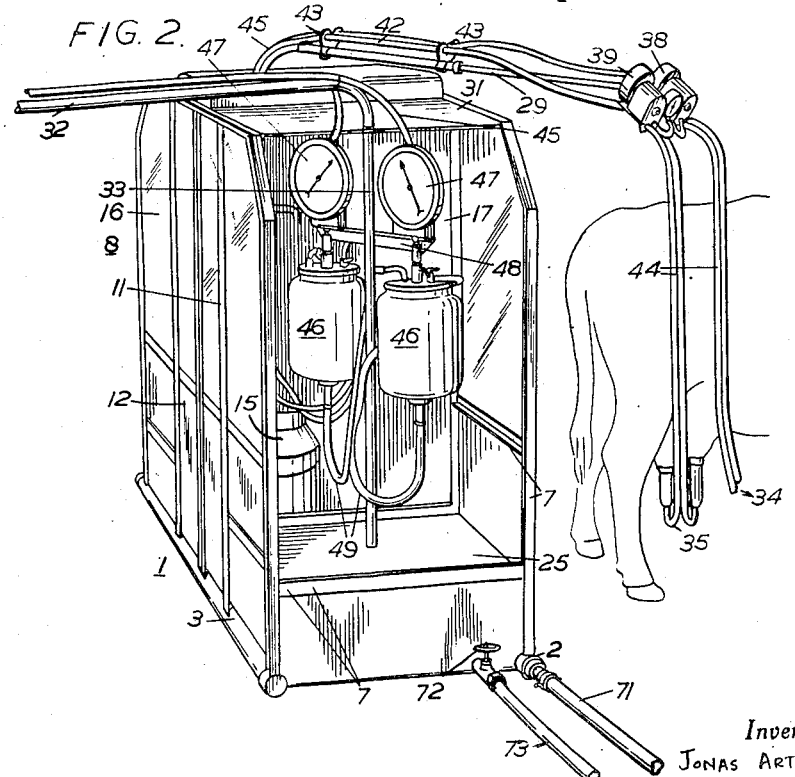

The foregoing and other objects of the invention will be more readily understood from the following description of a transportable pneumatic milking machine constructed in accordance with this invention, said machine being illustrated in the accompanying drawings, wherein:

Figure 1 is a pictorial view of one form of machine, looking mainly toward the right-hand side thereof, this machine being adapted to be moved solely by manual effort, Figure 2 is a pictorial view of the same machine, looking mainly toward the rear end thereof, Figure 3 is a longitudinal elevation, with parts removed for clarity, and in which, for clearness, is shown only one teat-cup cluster and pulsator assembly, with only so much of the associated milk and vacuum connections as are necessary for an understanding of the invention, Figure 4 is a plan view of the machine, with the vehicle roof removed and certain parts broken away for clearness, Figure 5 is a plan view of the tubular chassis, to illustrate how certain components thereof are employed as milk and vacuum conduits, Figures 6 and 7 are a side elevation and a cross section of the chassis and the framework of the vehicle body, and Figure 8 is a detail view showing an air-tight joint used on a telescopic arm.

In the embodiment illustrated in the drawings the milking machine comprises a skeleton chassis 1 made of two side tubes 2, 3 interconnected by welding thereto a number of cross tubes 4, 5, 6, said chassis carrying the framework 7 of a covered body 8 provided with a number of doors 9, 10, 11, 12 to facilitate access to the interior of the body. These doors are arranged in two pairs 9, 10 and 11, 12, one pair in each side of the body at the centre of length thereof, the two doors comprising a pair being adapted to close a common opening and thus afford ready access, when the doors are open, to a platform 13 constituting the floor of the central compartment 14 of the covered body 8. This platform 13 is arranged as near as possible to ground level, so that cans 15 can readily be lifted on to said platform 13, on which they stand while the machine is in use. The upper halves of the doors 9, 10, 11, 12 and the upper part of the body 8 are comprised of or incorporate transparent panels or windows. The combined width of two centrally disposed doors 9, 10 and 11, 12 on each side of the body 8 is such as to provide cubicles 16, 17 at opposite ends of the interior of the body.

The cubicle 16 at the front end of the body 8 is divided by a horizontal partition 18 to provide an upper compartment 19 accessible from the interior of the body 8 and a lower compartment 20 accessible from the exterior of the body 8. The lower compartment 20 is open at front and bottom and provides a convenient space within which to accommodate partially a pair of steerable front wheels 21. The steerable front wheels 21 are associated with an axle assembly 22, mounted for swivelling about the vertical axis of an axle 23, said assembly 22 including a forwardly extending steering handle 24.

The cubicle 17 at the rear end of the body 8 is similarly divided by a horizontal partition 25 to provide upper and lower compartments 26, 27, both of which are accessible from the interior of the body. The lower rear compartment 27 constitutes a housing for a pair of non-steerable rear wheels 28 and for other components or assemblies associated with the traction of the vehicle.

The milking machine is provided with two swinging arms, each carrying independent milking assemblies. The swinging arm 29 is attached to and extends horizontally and radially from an upright post 30 mounted centrally in the front cubicle 16, said arm 29 and post 30 being made as a unitary structure which comprises a tube of approximately inverted L shape, one limb passing substantially vertically through an opening in the roof 31 of the body 8 whilst the other limb of the inverted L-shaped tube extends substantially horizontally and radially above said roof and constitutes the swinging arm proper. Another arm 32 and integral post 33 are similarly mounted at the rear of the body 8.

Each L-shaped tube constituting an arm-and-post structure serves as a vacuum pipe and supports at the outer end of the substantially horizontal arm-forming limb thereof, one or more pulsators according to the number of teat-cup clusters suspended from said arm. It is convenient to provide four teat-cup clusters of which two clusters 34, 35 are shown, each with its own pulsator, 38, 39, 40, 41 respectively, two assemblies in association with each swinging arm 29 and 32. The horizontal arms 29, 32 to which the pulsators 38, 39, 40, 41 are connected, are flanked by non-corrodible metal milk pipes 42 supported above the arms 29, 32 by brackets 43, the outer ends of said pipes 42 being attached by flexible pipes 44, leading to the teat-cup clusters 34, 35. To the inner ends of the metal milk pipes 42 are attached flexible pipes 45 leading one to each of a number of milk collecting containers 46, there being one container 46 for each of the teat-cup cluster and pulsator assemblies. The containers 46 are preferably made of heat-resisting glass, such as that known in Great Britain, for instance, under the Registered Trade-Mark Pyrex. Two milk containers 46 are disposed on opposite sides of each of the vertical posts 30, 33 which support the swinging arms 29, 32, and each of said containers 46 is suspended from a weighing appliance 47 having a vertical dial visible through the transparent panels of the vehicle body 8. The two weighing appliances 47 associated with a post 30 or 33 are carried on a common cross bar 48 secured to the post.

The two swinging arms 29, 32 carried by the vehicle are of identical construction and carry or are associated with identical assemblies, so that the vehicle has four teat-cup clusters each associated with a milk container having its own weight or indicating appliance. From one to four cows can thus be milked at the same time, that is, four cows in adjoining stalls on one side of a passageway in a cowhouse in which the vehicle is standing or two cows in adjoining stalls on each of the opposite sides of said passageway. When the two sets of teat cups on one swinging arm are disengaged, the machine may be wheeled forward, even though the two sets of teat cups on the other arm are still operating. This enables milking to proceed without having to wait until the slowest cow of four has finished before moving the machine.

The four containers 46 are connected by flexible pipes 49 to a common milk receiver 50 which is suspended by a pivot pin 51 at the outer end of a jib 52 which extends laterally across the framework 7 of the body 8 from a tube 53 upstanding from the side tube 3 of the chassis 1 so that the receiver 50 hangs centrally in the upper part of the centre compartment 14 of the body 8. A split-end tube 54 also extends laterally below and parallel to the jib 52 to receive a spigot pin 55 forming part of a yoke 56 having notched end arms for receiving pins 57 secured to the top of the casing 58 of a vacuum milk cooling unit 59, to which the milk receiver 50 is attached by a tubular connector 60. Water for cooling is supplied to the cooling unit 59 through a flexible pipe 61 and a source of vacuum is applied to the cooling unit 59 by a flexible pipe 62 in a manner more particularly described later on, and each of the cans 15 on platform 13 is connected by a vacuum pipe 63 and a milk delivery pipe 64, both attached to a can head 65. The whole of the equipment through which the milk flows, that is, the teat cup clusters 38, 39, 40, 41, the four milk collecting containers 46, the single milk receiver 50, the cooling unit 59 and the cans 15 are so interconnected by pipe lines as to ensure the collection of the milk takes place under a condition of vacuum.

The cooling unit 59 houses a milk cooler of any suitable construction, the cooler being withdrawable for cleaning purposes through removable end doors 66 clampable over the casing openings by swing-over clamping bars 67 mounted alongside of the casing 58.

Each milk pipe 64 is attached to a can head 65 by means of a tube 66a, which is longer than a tube 67a by means of which the associated vacuum pipe 63 is connected to the can head 65, so that when the milk accumulated in the can 15 reaches the level of the milk tube 66a the flow of milk to that can is arrested automatically.

In the machine illustrated the chassis 1 is of tubular construction and advantage has been taken of this fact by utilizing some of the tubular components of the chassis as vacuum and water conduits, as shown more clearly in Figures 5, 6 and 7. The corresponding ends of cross tubes 4 and 5 communicate with the side tube 2, the other ends of said cross tubes 4, 5 being blocked, so that negative air pressure (indicated by dotted-line arrows) to provide a vacuum effect can be applied through the side tube 2 and cross tubes 4, 5 through stub connector tubes 68 to the posts 30, 33 (and thence to the pulsators) via airtight jointing sleeves 69 which admit of turning of said posts 30, 33 relatively to cross tubes 4, 5 respectively. The vacuum effect is also applied from side tube 2 through a vertical tube 70 and thence by the flexible pipe line 62 to the cooling unit 59. The side tube 2 is connected to an existing vacuum line in a cowhouse through a trailing hose 71. Water (indicated by full-line arrows) for the cooling unit is supplied, via a cut-off valve 72 through a trailing hose 73, connected to a static water supply, to the cross tube 6 of the chassis 1 and thence through the side tube 3, the vertical tube 53, a connector branch 74 and the flexible pipe 61 to the cooling unit 59.

The direct control of milk flow is avoided, thereby simplifying cleaning, by the use of a vacuum control means provided for each milking assembly. The vacuum control means comprises an air tap 75 set in the vacuum pipe 76 which connects a milk collecting container 46 to the source of negative pneumatic pressure available in the adjacent post 30 or 33. This tap 75 is so constructed and connected that in one position, that is, the position used during milking, the tap connects said container 46 direct to the source of vacuum, whilst at the same time opening to vacuum a control tap for the associated teat-cup cluster, thus enabling milking of the cow to be effected. In a second of its two possible positions the air tap 75 shuts off the vacuum and admits atmosphere to the container 46 at a controlled rate so as to prevent lowering of the vacuum in the system when the milk receiver 50 connected to the vacuum cooler is empty; during such times the control tap of the teat cup cluster is shut off to atmosphere.

For convenience of manufacture and to increase the effective "reach" of the teat-cup clusters, the radial arms 29, 32 may be of telescopic construction as shown in Figure 8. In this case the outer part of the arm 32, for instance, is constituted by a pipe 32A telescopically slidable within the outer part 32B which is formed integral with post 33. The outer end of tube part 32B is screw-threaded to receive an adjustable nut 77 which is adapted to force a rubber sealing ring 78 around the arm part 32A (Figure 8).

What I claim is:

1. A transportable pneumatic milking machine comprising, in combination, a wheeled chassis; a covered body including a roof, supported on said chassis and consisting of a central low level can-supporting platform between two end cubicles; upright pillars mounted for rotation about vertical axes, one in each of said end cubicles; arms radially extending one from each upright pillar for swinging in a substantially horizontal plane over the roof of said body; at least one pulsator mounted on the outer end of each radial arm and at least one teat cup cluster associated with each pulsator and suspended from the outer end of said radial arm; milk-yield weight indicating appliances of dial-type, one for each teat cup cluster and each mounted on one or other of said rotatable pillars; milk collecting containers, one for each teat cup cluster and also each mounted on one of said rotatable pillars, so that the dial of a weight-indicating appliance always faces toward the outer end of its associated arm; a milk receiver mounted over the can-supporting platform; a milk cooling unit mounted above said can-supporting platform but below said milk receiver; sealing heads adapted to co-operate each with a can stood on said can-supporting platform, and milk and vacuum conduits connecting the teat cup clusters to the respective milk collecting containers, the said containers in common to the milk receiver, the milk receiver to the milk cooling unit and the sealing heads to the milk cooling unit, to constitute closed fluid systems so that milk is delivered under conditions of controlled vacuum.

2. A machine as claimed in claim 1, characterised in that each of said can sealing heads is provided with means adapted to arrest automatically the flow of milk to the can when the milk reaches a pre-arranged level therein.

3. A machine according to claim 1, characterised in that the chassis is of tubular construction and that some of the tubular components of the chassis are employed as conduits for cooling water delivered to the machine from an outside source by a flexible pipeline.

4. A machine according to claim 1, characterised in that the chassis is of tubular construction, that the associated pillars and arms are of tubular form, and that some of the tubular components of the chassis are coupled to said hollow pillar and arm assemblies to form conduits through which the pulsators suspended on the radial arms are placed in connection with a source of negative pneumatic pressure.

J. A. KINGSTON.

REFERENCES CITED

The following references are of record in the file of this patent:

UNITED STATES PATENTS

| Number | Name | Date |
| --- | --- | --- |
| 1,010,328 | Umrath | Nov. 28, 1911 |
| 1,377,244 | Ekern et al. | May 10, 1921 |
| 1,494,138 | Shippert et al. | May 13, 1924 |
| 1,536,634 | Shippert et al. | May 5, 1925 |
| 1,603,429 | Uphaus et al. | Oct. 19, 1926 |
| 1,910,830 | Hapgood | May 23, 1933 |